US008308310B2

(12) United States Patent
Sakamoto

(10) Patent No.: US 8,308,310 B2
(45) Date of Patent: Nov. 13, 2012

(54) REAR-VIEW MIRROR SYSTEM WITH DISPLAY DEVICE

(75) Inventor: Hirosshi Sakamoto, Miyazaki (JP)

(73) Assignee: Honda Lock Mfg. Co., Ltd, Miyazaki (JP)

( * ) Notice: Subject to any disclaimer, the term of this patent is extended or adjusted under 35 U.S.C. 154(b) by 534 days.

(21) Appl. No.: 12/233,738

(22) Filed: Sep. 19, 2008

(65) Prior Publication Data

US 2009/0091851 A1 Apr. 9, 2009

(30) Foreign Application Priority Data

Oct. 4, 2007 (JP) ................................ 2007-260503

(51) Int. Cl.
*G02B 5/08* (2006.01)

(52) U.S. Cl. ...................................................... 359/841

(58) Field of Classification Search .................. 359/838, 359/841, 871–877

See application file for complete search history.

(56) References Cited

U.S. PATENT DOCUMENTS 5,223,814 A 6/1993 Suman
2003/0095047 A1 5/2003 DeLine et al.
2007/0053062 A1 * 3/2007 Sasaki et al. .................. 359/582
2007/0171037 A1 * 7/2007 Schofield et al. ............. 340/438

FOREIGN PATENT DOCUMENTS

JP 54-33550 3/1979
JP 08-175263 7/1996

* cited by examiner

*Primary Examiner* — Jennifer L. Doak
(74) *Attorney, Agent, or Firm* — Berenato & White, LLC

(57) ABSTRACT

In a rear-view mirror system with display device in which a display device is attached to a rear-view mirror device disposed in a car room, a display device includes a display housing having a display window disposed at the periphery of a rear-view mirror and disposed in contiguous with a mirror housing, a light reflection device faced to the display window and disposed in the display housing, and a emission display device faced to the light reflection device and disposed in the display housing, in which a relative arrangement for the display window, the light reflection device, and the emission display device is determined such that emission display information displayed by the emission display device and reflected on the light reflection device transmits the display window, whereby the system can use an emission display device of low luminance while sufficiently ensuring the rearward view by the rear-view mirror, and can obtain emission information at the display window while decreasing the feeling of distance relative to images reflected on the rear-view mirror.

2 Claims, 6 Drawing Sheets

REAR-VIEW MIRROR SYSTEM WITH DISPLAY DEVICE

BACKGROUND OF THE INVENTION

1. Field of the Invention

The present invention concerns a rear-view mirror system with display device in which a rear-view mirror for obtaining a rearward view of a car is held in a mirror housing, and a display device for displaying information different from that of the rearward view obtained at the rear view mirror is attached to a rear-view mirror device disposed in a car room.

2. Description of the Related Art

Rear-view mirror systems disposed in a car room and provided with a display device such as for televisions, clocks, images behind car upon rearward movement of the car, and navigation system have been known so far. Japanese Unexamined Utility Model Publication No. 54-33550 discloses a system in which a display device is disposed to the outer lateral side of a rear-view mirror and Japanese Unexamined Patent Publication No. 08-175263 discloses a display device including a display window disposed on a plane identical with that of the rear-view mirror, an emission display device disposed in a mirror housing and an information display mirror that reflects emission information from the emission display device and transmits the same through the display window.

However, in the system disclosed in the JM-A No. 54-33550, since focal points are different between images displayed on the rear-view mirror (far images) and images displayed on the display device (near images), (1) this obliges a car driver not only to transfer the line of sight but also adjust the focal distance of eyes and (2) a display device of high luminance to ambient light is required since the display device is exposed to the outside, and this increases the consumption current and increases the amount of heat generation.

On the other hand, in the system disclosed in JP-A No. 08-175263, the problems in (1) and (2) above can be solved. However, since the display window is disposed being adjacent with the rear-view mirror or the display window is formed to a portion of the rear-view mirror and the rearward view obtained at the rear-view mirror is narrowed, this hinders the visibility for the rearward view. Further, in a case of forming the display window to a portion of the rear-view mirror, it discloses a method of making the reflection film of the rear-view mirror with a total reflection film and cutting out a portion of the total reflection film to form a display window, a method of forming the reflection film of the rear-view mirror with a translucent reflection film and a black color coating film and cutting out a portion of the back color coating film to form a display window, and a method of making only the portion of the reflection film of the rear-view mirror that corresponds to the display window as a translucent reflection film and making a remaining portion as a total reflection film. However, in a case where the translucent reflection film is present for a portion of the rear-view mirror corresponding to the display window, since emission display information reflected on the information display mirror has to transmit the translucent reflection film, it needs an emission display device of high luminance, and this increases the consumption current and increases the mount of heat generation.

SUMMARY OF THE INVENTION

The present invention has been achieved in view of the foregoing situations and it intends to provide a rear-view mirror system with display device capable of using an emission display device at low luminance while sufficiently securing a rearward view by a rear-view mirror and, in addition, capable of obtaining emission information on a display window while decreasing feeling of distance with respect to images reflected on the rear-view mirror.

The present invention provides a rear-view mirror system with display device in which a rear-view mirror for obtaining rearward view of a car is held in a mirror housing and a display device for displaying information different from that of the rearward view obtained by the rear-view mirror is attached to a rear-view mirror device disposed in a car room, wherein the display device includes a display housing having a display window disposed at the periphery of the rear-view mirror and disposed in contiguous with the mirror housing, a light reflection device disposed in the display housing while facing the display window, and an emission display device disposed in the display housing while facing the light reflection device, and a relative arrangement for the display window, the light reflection device, and the emission display device is determined such that the emission display information displayed by the emission display device and reflected on the light reflection device transmits the display window.

In one embodiment of the invention, a light permeable cover member closing the display window is attached to the display housing with the outer surface thereof being situated so as to make an angle relative to the outer surface of the rear-view mirror.

In another embodiment of the invention, the mirror housing is supported swivelably to a housing support portion on the side of a car body, and the display housing is disposed in contiguous with the mirror housing at a position close to the housing support portion.

In a further embodiment of the invention, the rear-view mirror is held in the mirror housing such that it can rotate between a not anti-dazzling position and an anti-dazzling position.

A reflection mirror 30 of the embodiment corresponds to the light reflection device of the invention and a lens 32 of the embodiment corresponds to the cover member of the invention.

In the invention, since the display window of the display device is disposed at the periphery of the rear-view mirror, the rearward view obtained by the rear-view mirror is not narrowed and the visibility for the rearward view can be enhanced. Further, since the emission display information does not transmit the reflection film of the rear-view mirror, and the emission display device and the light reflection device are arranged in the display housing, they do not suffer from the effect of an ambient light. Since the emission display device of high luminance is not necessary, current consumption can be decreased and the amount of heat generation can be suppressed for the emission display device. In addition, since the emission display device and the light reflection device are disposed in the display housing, visibility at the display window can be improved not suffering from the effect from the external light. Further, since the emission display information displayed by the emission display device and reflected on the light reflection device transmits the display window, the difference of focal points between the images behind the car reflected on the rear-view mirror and the emission display information obtained at the display window can be decreased to enhance the visibility.

Further, in the embodiment of the invention, since the light permeable cover member closing the display window is attached to the display housing so as to make an angle relative to the outer surface of the rear-view mirror, images behind the car due to surface reflection identical with that of the images reflected on the rear-view mirror are not reflected and the visibility can be enhanced, for example, by disposing the cover member directing to the ceiling portion in the car room such that images or light behind the car cannot be reflected on the cover member.

In another embodiment of the invention, since the display housing is disposed in contiguous with the mirror housing that is swivelably supported by the housing support portion on the side of the car body at a position close to the housing support portion, this can prevent undesired tilting of the mirror housing due to exertion of the weight of the display device on the mirror housing.

In the further embodiment of the invention, when the rear-view mirror is rotated between the not anti-dazzling position and the anti-dazzling position, the position and the angle of the display window are not changed and emission display information by the display device can be visually recognized reliably.

DESCRIPTION OF THE ACCOMPANYING DRAWINGS

PREFERRED EMBODIMENT OF THE INVENTION

Preferred embodiments of the invention are to be described based on examples of the invention shown in the appended drawings.

Figure 1:
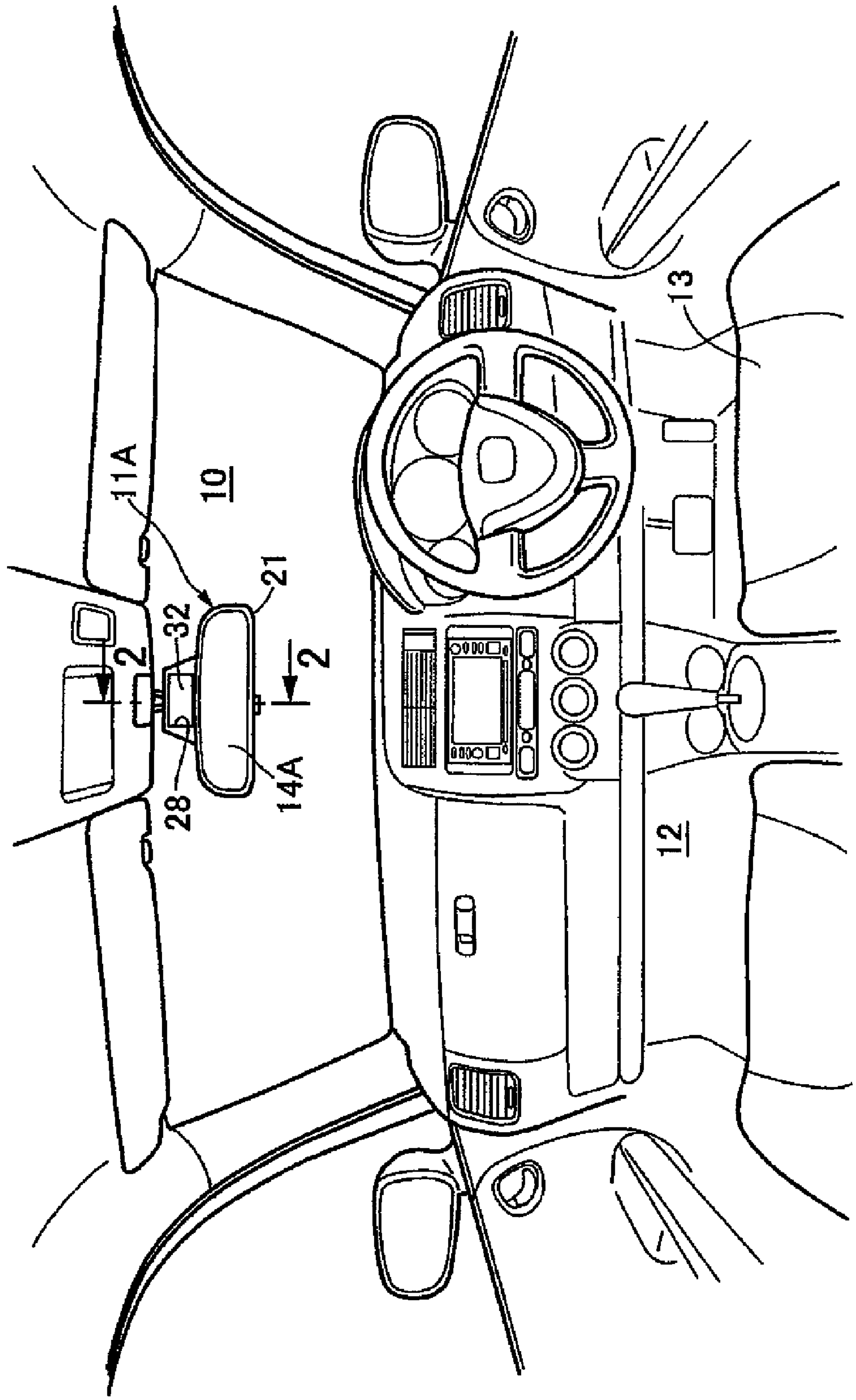
FIG. 1 is a view showing a first embodiment that shows the front portion in the inside of a car room as viewed from the rearward.
Figure 2:
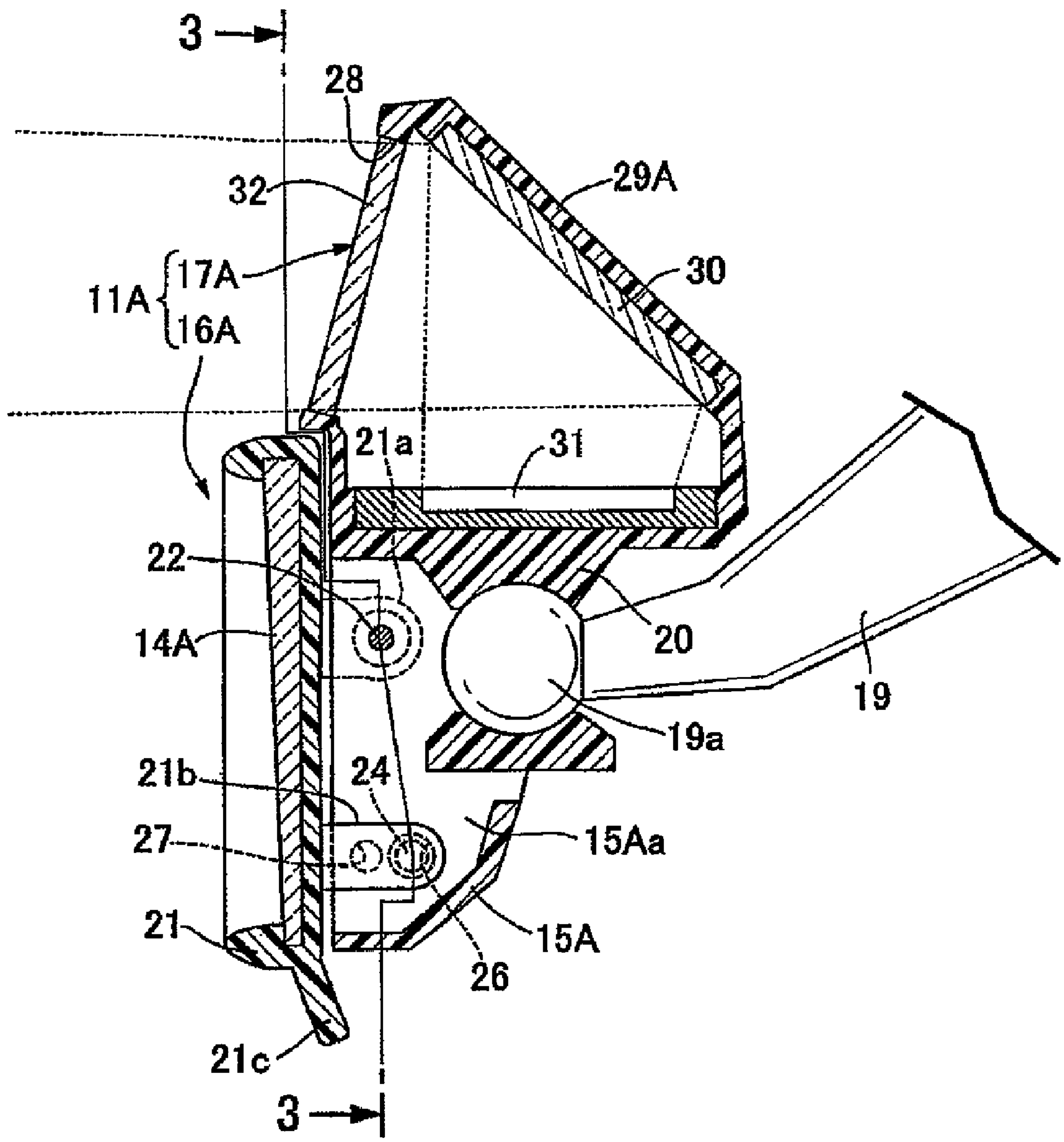
FIG. 2 is a cross sectional view taken along line 2-2 in FIG. 1.
Figure 3:
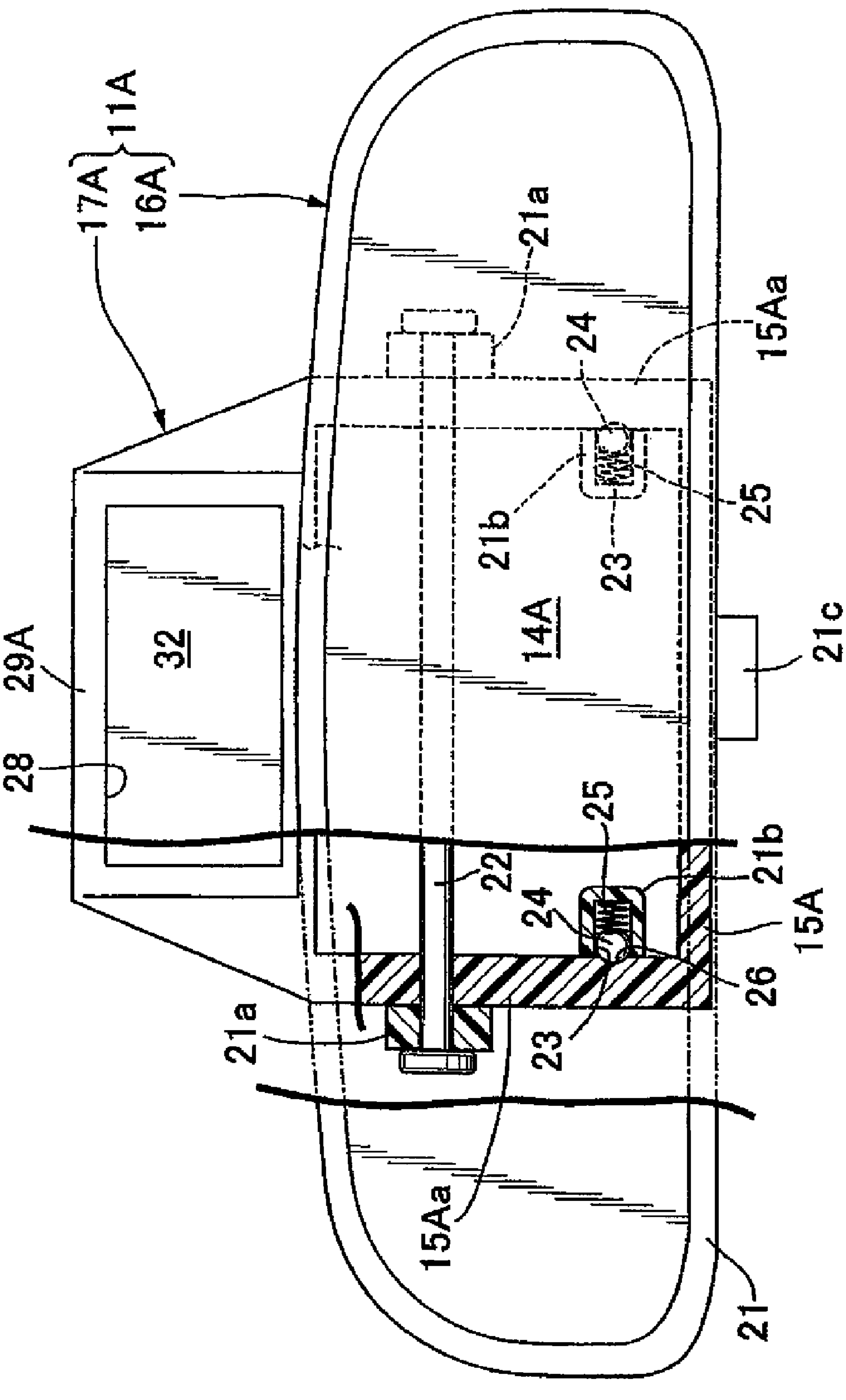
FIG. 3 is a cross sectional view partially cutaway along line 3-3 in FIG. 2.

FIG. 1 to FIG. 3 show a first embodiment of the invention in which FIG. 1 is a view showing a front portion in a car room from the rearward, FIG. 2 is a cross sectional view taken along line 2-2 in FIG. 1, and FIG. 3 is a partially cutaway cross sectional view along line 3-3 in FIG. 2.

At first in FIG. 1, a rear-view mirror system 11A with display device according to the invention is disposed rearward of a lateral central portion of a front glass 10, and a car driver who sits on a driver's seat 13 disposed, for example, on the front right side in a car room 12 can obtain a rearward view of a car by the rear-view mirror system 11A with display device and can visually recognize video images, for example, behind a rear door, for example, upon rearward movement of the car by a display window 28 equipped to the rear-view mirror system 11A with display device.

In FIG. 2 and FIG. 3, the rear-view mirror system 11A with display device includes a rear-view mirror device 16A having a rear-view mirror 14A for obtaining a rearward view of the car held to a mirror housing 15A made of a synthetic resin and a display device 17A non-movably attached (i.e., fixed) thereto for displaying information different from that of the rearward view obtained at the rear-view mirror 14A.

The mirror housing 15A is formed in a box-like configuration having a pair of right and left side walls 15Aa and 15Ab and opened to the rearward of the car and swivelably supported to a housing support portion 19 on the car side disposed to a not-illustrated car body. That is, the housing support portion 19 is formed as a rod-like configuration having a spherical portion 19*a* at the top end. An attaching portion 20 for fitting the spherical portion 19*a* is disposed to the lateral central portion of the mirror housing 15A. By fitting the spherical portion 19*a* to the attaching portion 20, the mirror housing 15A is swivelably supported to the housing support portion 19 on the side of the car.

The rear-view mirror 14A is a prism having a thickness increasing upward. The rear-view mirror 14A is attached to the mirror holder 21 by fitting at the peripheral edge thereof to the mirror holder 21. Further, a pair of right and left brackets 21*a* and 21*a* disposed at the back of the mirror holder 21 and opposed from the outside to both side walls 15Aa, 15Aa of the mirror housing 15A are rotationally supported by way of a support shaft 22 having an axis extending in the lateral direction of the car body to both side walls 15Aa, 15Aa of the mirror housing 15A. Further, a pair of right and left arms 21*b*, 21*b* protruding rearward below both of the brackets 15Aa, 15Aa are protruded integrally at the back of the mirror holder 21, and the arms 21*b*, 21*b* are intruded in the mirror housing 15A so as to oppose to both side walls 15Aa, 15*a* of the mirror housing 15A from the inward.

The arms 21*b*, 21*b* are provided with bottomed containment holes 23, 23 each having a closed end on the side opposite to the side walls 15Aa, 15Aa, click balls 24, 24 are contained respectively at the opening ends of the containment holes 23, 23, and springs 25, 25 for resiliently energizing the click balls 24, 24 toward the side walls 15Aa, 15Aa are interposed under contraction between the closed ends of the containment holes 23, 23 and the click balls 24, 24.

On the other hand, two semispherical concaves 26, 26 and 27, 27 capable of partially engaging the click balls 24, 24 upon rotation of the mirror holder 15 around the axis of the support shaft 22 are formed to the lateral side walls 15Aa, 15Aa, of the mirror housing 15A. The mirror holder 21 and the rear-view mirror 14A are at a not anti-dazzling position upon engagement of the click balls 24, 24 to the concaves 26 on one side and the mirror holder 21 and the rear-view mirror 14A are at an anti-dazzling position upon engagement of the click balls 24, 24 to the concaves 27, 27 on the other side. That is, the rear-view mirror 14A is held on the mirror housing 15A such that it can rotate between the not anti-dazzling position and the anti-dazzling position. A knob 21*c* for rotational operation of the mirror holder 21 and the rear-view mirror 14A between the not anti-dazzling position and the anti-dazzling position is disposed integrally at a lower portion of the mirror holder 21.

The display device 17A includes a display housing 29A having a display window 28 disposed at the periphery of the rear-view mirror 14A and disposed in contiguous with the mirror housing 15A, a reflection mirror 30 as a light reflection device disposed in the display housing 29A while facing the display window 28 and an emission display device 31 disposed in the display housing 29A while facing the reflection mirror 30. A relative arrangement for the display window 28, the reflection mirror 30, and the emission display device 31 is determined such that the emission display information displayed by the emission display device 31 and reflected on the reflection mirror 30 transmits the display window 28.

Then, the emission display device 31 is a liquid crystal display for displaying video images behind the rear door, for example, upon rearward movement of the car. Further, the display housing 29A may be disposed integrally contiguous with the mirror housing 15A, or a display housing 29A as a member separate from the mirror housing 15A may be non-movably attached (i.e., fixed) to the mirror housing 15A. In addition, the display housing 29A is disposed above the mirror housing 15A in contiguous therewith at a lateral central portion thereof, and the display housing 29A is disposed in contiguous with the mirror housing 15A at a position close to the housing support portion 19.

In the display housing 29A, a lens 32 as a light permeable cover member closing the display window 28 is attached, for example, such that the outer surface thereof is directed to the ceiling portion of the car room 12 while being arranged so as to make an angle to the outer surface of the rear-view mirror 14A. An anti-reflection film may be formed to the outer surface of the lens 32.

Referring then to the operation of the first embodiment, the display device 17A non-movably attached to the rear-view mirror device 16A disposed in the car room 12 includes the reflection mirror 30 having the display window 28 disposed at the periphery of the rear-view mirror 14A of the rear-view mirror device 16A and is contiguous with the mirror housing 15A and the emission display device 31 disposed in the display housing 29A being faced to the reflection mirror 30, and a relative position for the display window 28, the reflection mirror 30, and the emission display device 31 is determined such that the emission display information displayed by the emission display device 31 and reflected on the reflection mirror 30 transmits through the display window 28.

Accordingly, since the display window 28 of the display device 17A is disposed at the periphery of the rear-view mirror 14A, the rearward view obtained by the rear-view mirror 14A is not narrowed and the visibility for the rearward view can be enhanced. Further, since the emission display information does not transmit the reflection film of the rear-view mirror 14A, and the emission display device 31 and the reflection mirror 30 are disposed in the display housing 29A, they do not suffer from the effect of the ambient light. Then, since the use of the emission display device 31 of high luminance is not necessary, current consumption can be decreased and the amount of heat generation can be suppressed for the emission display device 31. In addition, the visibility at the display window 28 can be enhanced so as not to undergo the effect of an external light by disposing the emission display device 31 and the reflection mirror 30 in the display housing 29A. Further, since the emission display information displayed by the emission display device 31 and reflected on the reflection mirror 30 is adapted to transmit the display window 28, the difference of the focal points between the images behind the car reflected on the rear-view mirror 14A and the emission display information obtained at the display window 28 is decreased and the visibility can be enhanced.

Further, since the light permeable lens 32 for closing the display window 28 is attached to the display housing 29A so as to make an acute constant angle at the outer surface thereof relative to the outer surface of the rear-view mirror 14A, the images behind the car by surface reflection identical with that of the images reflected on the rear-view mirror 14A are not reflected and the visibility can be enhanced, for example, by directing the lens 32 to the ceiling portion in the inside of the car room 12 such that the images or light behind the car cannot be reflected at the lens 32.

Further, since the mirror housing 15A in the rear-view mirror device 16A is swivelably supported to the housing support portion 19 on the side of the car body and the display housing 29A of the display device 17A is disposed in contiguous with the mirror housing 15A at a position close to the housing support portion 19, this can avoid undesirable tilting of the mirror housing 15A by exertion of the weight of the display device 17A on the mirror housing 15A.

Further, since the rear-view mirror 14A of the rear-view mirror device 16A is held to the mirror housing 15A such that it can rotate between the not anti-dazzling position and the anti-dazzling position, when the rear-view mirror 14A is rotated between the not anti-dazzling position and the anti-dazzling position, the position and the angle of the display window 28 remain unchanged (i.e., constant) and the emission display information by the display device 17A can be visually recognized reliably.

Figure 4:
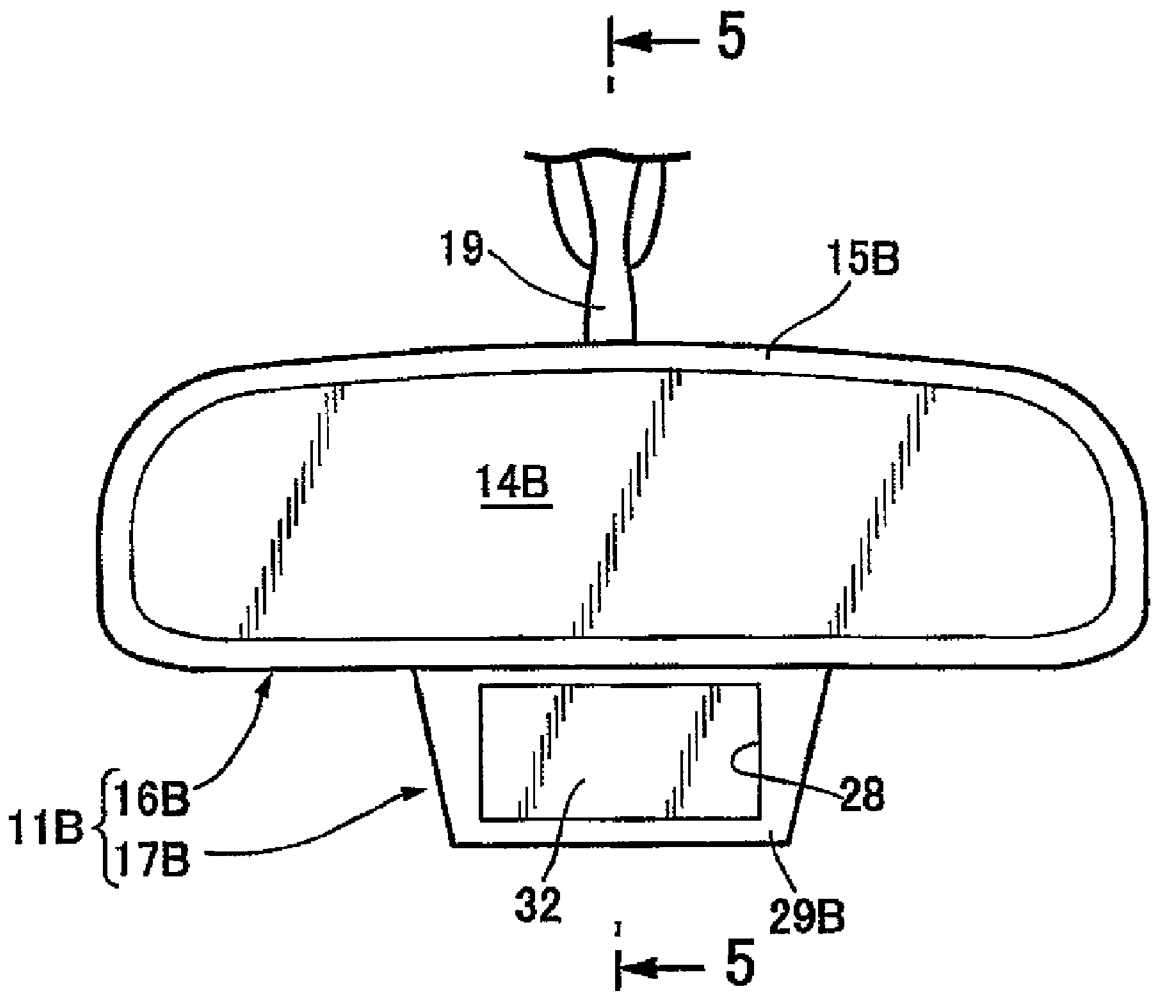
FIG. 4 is a front elevational view of a rear-view mirror system with display device of a second embodiment.
Figure 5:
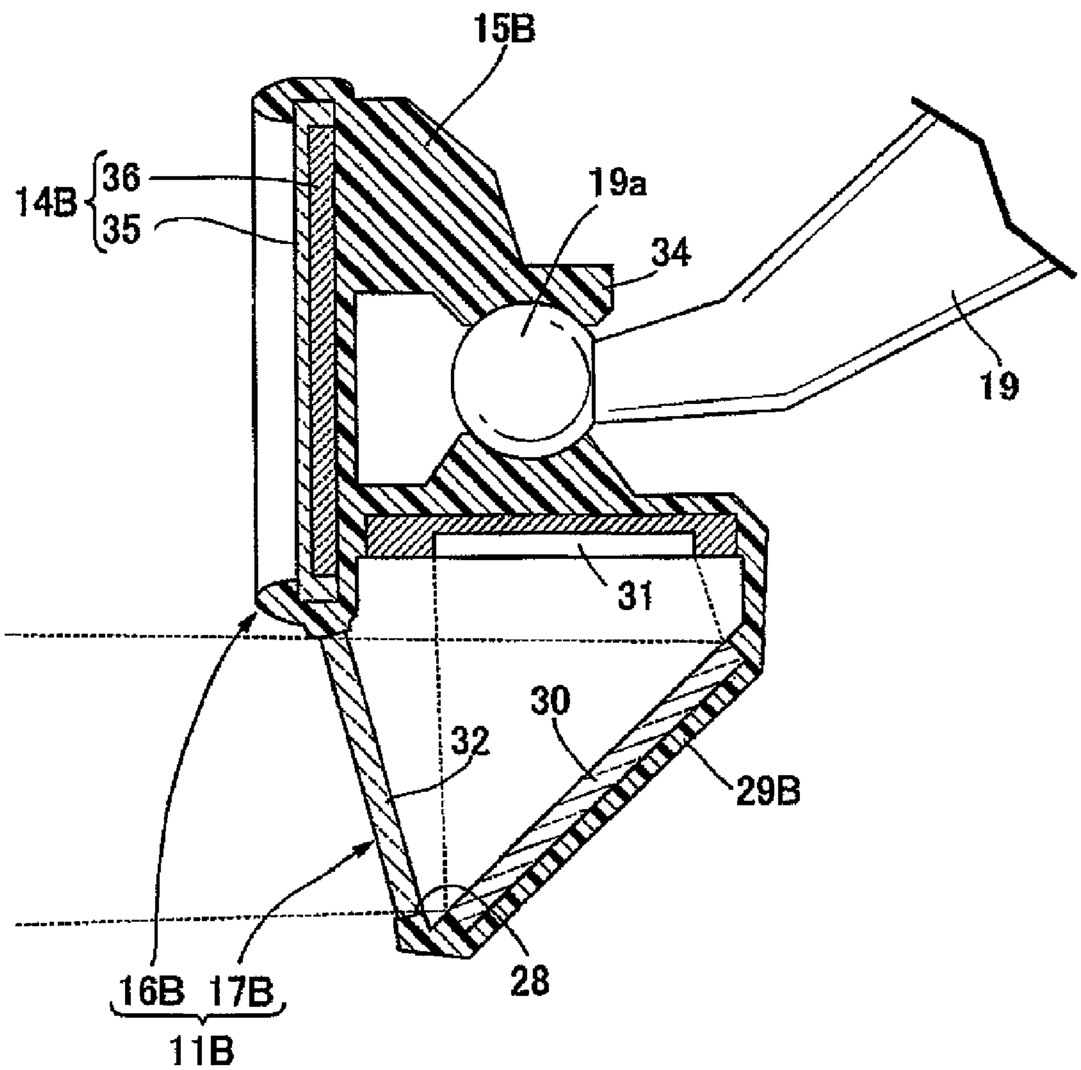
FIG. 5 is a cross sectional view taken along line 5-5 in FIG. 4.

FIG. 4 and FIG. 5 show a second embodiment of the invention in which FIG. 4 is a front elevational view of a rear-view mirror system with display device and FIG. 5 is a cross sectional view taken along line 5-5 in FIG. 4.

A rear-view mirror system 11B with display device includes a rear-view mirror device 16B having a rear-view mirror 14B held in a mirror housing 15B made of a synthetic resin for obtaining a rearward view of a car and a display device 17B non-movably attached to rear-view mirror device 16B for displaying information different from that of the rearward view obtained by the rear-view mirror 14B.

The mirror housing 15B is swivelably supported to a housing support portion 19 on the side of a car body. That is, an attaching portion 34 for fitting a spherical portion 19*a* at the top end of the housing support portion 19 is disposed to the mirror housing 15B, and the spherical portion 19*a* is fitted to the attaching portion 34, by which the mirror housing 15B is swivelably supported to the housing support portion 19 on the side of the car body.

The rear-view mirror 14B is an electrochromic anti-dazzling mirror in which a laminate film 36 formed by laminating a transparent conductive film, an electrochromic layer, a reflection film, an electrode film, etc. is formed at the back of a glass substrate 35, and the rear-view mirror 14B can be switched between a not anti-dazzling state and an anti-dazzling state. The rear-view mirror 14B is fixedly held by the mirror housing 15B.

The display device 17B includes a display housing 29B having a display window 28 disposed at the periphery of the rear-view mirror 14B and disposed in contiguous with the mirror housing 15B, a reflection mirror 30 disposed in the display housing 29B while facing the display window 28, and an emission display device 31 disposed in the display housing 29B while facing the reflection mirror 30. The display housing 29B is disposed below and in contiguous with the mirror housing 15B at the lateral central portion thereof.

According to the second embodiment, like the first embodiment described above, since the display window 28 of the display device 17B is disposed at the periphery of the rear-view mirror 14B, the rearward view obtained by the rear-view mirror 14B is not narrowed and the visibility for the rearward view can be enhanced. Further, since the emission display information does not transmit the reflection film of the rear-view mirror 14B and the emission display device 31 and the reflection mirror 30 are disposed in the display housing 29B, they do not suffer from the effect of the ambient light, and the use of the emission display device 31 of high luminance is not necessary. Then, the current consumption can be decreased and the amount of heat generation can be suppressed for the emission display device 31. In addition, since the emission display device 31 and the reflection mirror 30 are disposed in the display housing 29B, the visibility at the display window 28 can be enhanced with no effect of an external light. Further, since the emission display information displayed by the emission display device 31 and reflected on the reflection mirror 30 is adapted to transmit the display window 28, the difference of the focal points between the images behind the car reflected on the rear-view mirror 14B and the emission display information obtained at the display window 28 is decreased and the visibility can be enhanced.

Further, since the display housing 29B of the display device 17B is disposed in contiguous with the mirror housing 15B at a position close to the housing support portion 19, this can avoid undesirable tilting of the mirror housing 15 due to exertion of the weight of the display device 17B on the mirror housing 15B.

Figure 6:
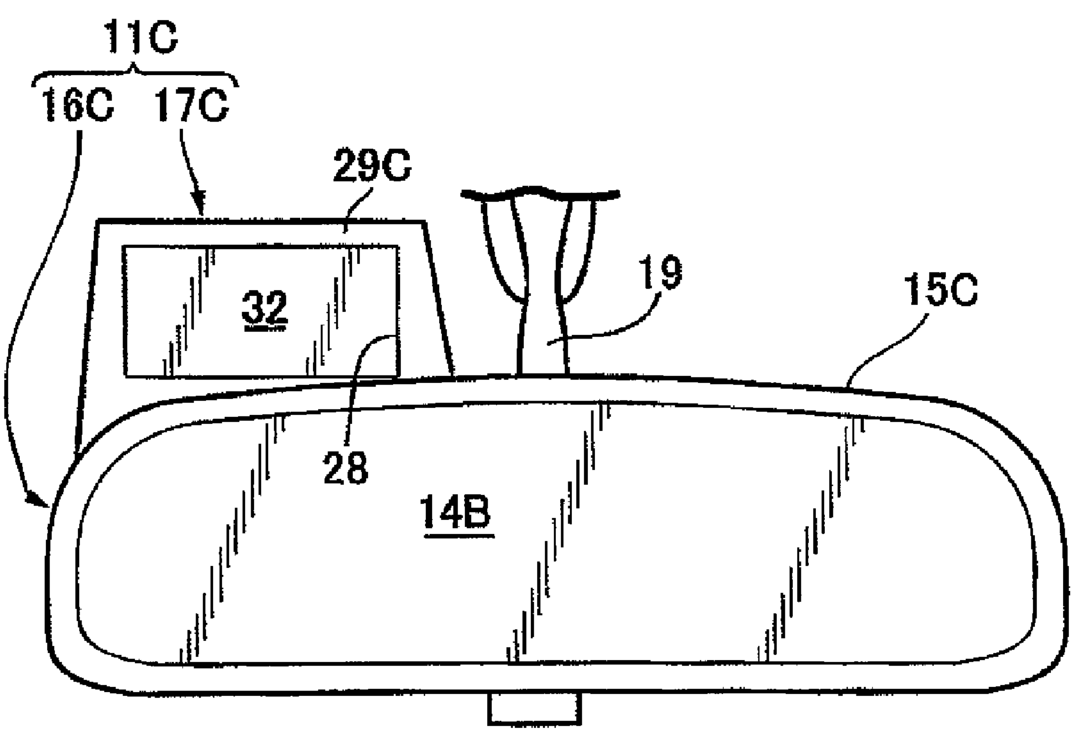
FIG. 6 is a front elevational view of a rear-view mirror system with display device of a third embodiment.

FIG. 6 shows a third embodiment of the invention in which portions corresponding to those of the second embodiment carry identical reference numerals, for which detailed descriptions are to be omitted.

A rear-view mirror system 11C with display device includes a rear-view mirror device 16C having a rear-view mirror 14B held fixedly to a mirror housing 15C made of a synthetic resin for obtaining a rearward view of a car and a display device 17C for displaying information different from that of the rearward view obtained by the rear-view mirror 14B.

A display housing 29C of the display device 17C is disposed in contiguous with the mirror housing 15C at a position localized either rightward or leftward from the lateral center of the mirror housing 15C (leftward in this embodiment).

According to the third embodiment, although the mirror housing 15C may possibly tilt undesirably by the exertion of the weight of the display device 17C on the mirror housing 15C, the rearward view obtained by the rear-view mirror 14B is not narrowed and the visibility for the rearward view can be enhanced in the same manner as in the second embodiment. Further, the current consumption can be decreased and the amount of the heat generation can be suppressed in the display device 17C, and the visibility on the display window 28 can be improved while avoiding the effect from the external light. The difference of the focal points between the images behind the car reflected on the rear-view mirror 14B and the emission display information obtained at the display window 28 can be decreased to enhance the visibility.

While the present invention has been described with respect to the preferred embodiments, the invention is not restricted to the embodiments described above and designs can be modified variously without departing from the gist of the invention described in the scope of the claims.

What is claimed is:

1. A rear-view mirror system comprising:

a rear-view mirror device disposed in a car room, the rear-view mirror device including a mirror housing and a rear-view mirror held in the mirror housing for obtaining a rearward view of a car; and a display device for displaying information different from that of the rearward view obtained by the rear-view mirror, the display device being non-movably attached to the rear-view mirror device;

the display device including:

a display housing having a display window, the display housing non-movably attached to the mirror housing and disposed at the periphery of the rear-view mirror integrally contiguous with the mirror housing;

a light reflection device disposed in the display housing so as to face the display window;

an emission display device disposed in the display housing so as to face the light reflection device; and a light permeable cover member closing the display window and attached to the display housing with the outer surface thereof being situated so as to make a constant acute angle relative to the outer surface of the rear-view mirror;

a relative arrangement for the display window, the light reflection device, and the emission display device being such that the emission display information displayed by the emission display device and reflected on the light reflection device being transmitted through the display window;

the rear-view mirror rotatable between a not anti-dazzling position and an anti-dazzling position without changing the position and angle of the display window.

2. The rear-view mirror system according to claim 1, wherein the mirror housing is supported swivelably to a housing support portion on the side of a car body, and wherein the display housing is integrally contiguous with the mirror housing at a position close to the housing support portion.

* * * * *